W. W. Gilbert.
Governor Valve.
Nº 89,399.  Patented Apr. 27, 1869.
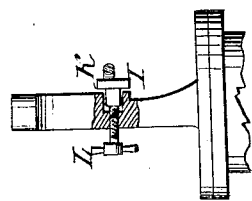
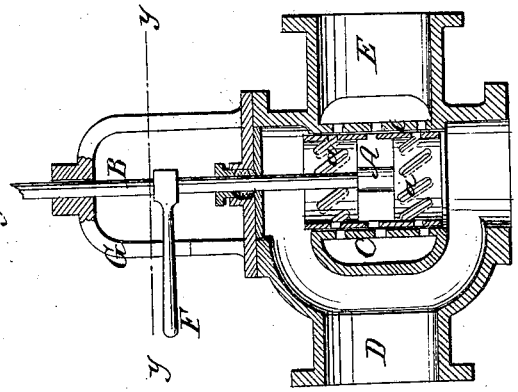
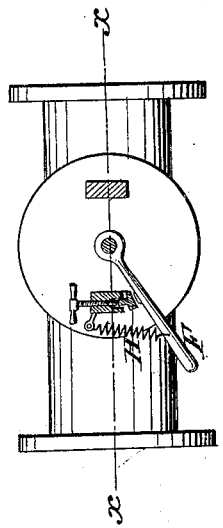
Witnesses.
C. Raettig.
Wm A Morgan.
Inventor.
W. W. Gilbert
per Munn & Co.
Attys.

United States Patent Office.

WALTER W. GILBERT, OF NEW YORK, N. Y.

Letters Patent No. 89,399, dated April 27, 1869.

IMPROVED GOVERNOR-VALVE.

The Schedule referred to in these Letters Patent and making part of the same.

*To all whom it may concern:*

Be it known that I, WALTER W. GILBERT, of New York, in the county of New York, and State of New York, have invented a new and useful Improvement in Governor-Valves; and I do hereby declare that the following is a full, clear, and exact description thereof, which will enable others skilled in the art to make and use the same, reference being had to the accompanying drawings, forming part of this specification.

This invention relates to improvements in governor-valves, for steam and other engines, whereby it is designed to provide an arrangement whereby the valve may be opened or closed, either by a movement in the direction of its length, or a rotary movement.

Also, to provide an arrangement whereby the valve will be automatically closed, when the governor ceases working from any cause.

In the accompanying drawings—

Figure 1 represents a sectional elevation of my improved valve, taken on the line $x\, x$ of fig. 2.

Figure 2 represents a horizontal section of the same, on the line $y\, y$ of fig. 1; and Figure 3 represents a detail view.

Similar letters of reference indicate corresponding parts.

A represents a hollow cylindrical valve, suspended from the stem B, connected to and operated by the governor, and provided with a corresponding hollow cylindrical seat.

The orifices $a$, through the valve and seat, for the passage of the steam, are arranged angularly to the perpendicular and horizontal lines, preferably at about forty-five degrees, whereby the opening and closing of the same may be effected either by a sliding or rotary movement of the valve, or by both movements combined.

D represents the receiving-pipe, and E the pipe leading to the engine, which may be double the capacity in cross-section of the valve, by reason of the arrangement of the same, to receive the steam at both ends, the passages $a$ having an area equal to that of D or E.

This arrangement admits of reducing the size of the valves proportionately to the steam-pipe, and thereby lessening the friction, and rendering the action more prompt and sensitive.

The seat of the valve being cylindrical, and the pipe E leading therefrom to the engine enveloping the said valve-seat, provides ample area to make the steam-orifices equal in capacity to both ends of the valve.

It also admits the said orifices to be equally distributed around the valve and its seat, whereby the valve is accurately balanced, which would not be the case if the said orifices were unequally distributed, or wholly on one side, in which case the reactionary pressure of the steam would force the valve against one side of its seat.

The valve-stem is provided with an arm, F, which is constantly borne against the frame G, or a projection thereon, by a spiral spring, H, or a weight, and a ledge, I, is arranged below the said bearing-surface, below which the said arm will pass when the governor stops running, as may frequently occur, by the breakage or running off of the belt, or from other causes, when the said arm will be forced around by the said spring or weight, thereby turning the valve on its axis sufficiently to shut off the steam, and arrest the attention of the attendant, and prevent disastrous consequences, from the engine being set into high motion, as sometimes occurs from the stoppage of the governor, and the opening of the valve.

The said bearing-surface K, on the frame for the arm F, may be made adjustable, and provided with a set-screw, L, whereby the valve may be adjusted in a rotary movement, either to open or close the passages while it is under the action of the governor, or by another arrangement, the set-screw L may be screwed through the arm F, and bear with its point against the surface K.

Having thus described my invention,

I claim as new, and desire to secure by Letters Patent—

1. The valve A, and seat C, both provided with inclined slots $a$, whereby the up-and-down movement of the valve, the rotary movement, or both combined, will open and close the steam-passages, substantially as herein shown and described.

2. The arrangement of the bearing-surface K, terminating in a ledge, I the spring H, or its equivalent, the arm F, and valve-spindle B, substantially as and for the purpose specified.

The above specification of my invention signed by me, this 21st day of November, 1868.

WALTER W. GILBERT.

Witnesses:
FRANK BLOCKLEY,
ALEX. F. ROBERTS.